INVENTOR
Albert Jefferies Baggott
BY
Karl W. Flocks
ATTORNEY

United States Patent Office 3,281,677
Patented Oct. 25, 1966

3,281,677
MEANS FOR DETERMINING THE SELF OR EARTH IMPEDANCE OF AN ELECTRIC SUPPLY SYSTEM BY PRODUCING AN INDICATION WHEN THE MAGNITUDE OF THE CURRENT EXCEEDS THAT FOR THE MAXIMUM PERMISSIBLE IMPEDANCE
Albert Jefferies Baggott, "Fairfields," Park Road, Oxted, England
Filed Nov. 14, 1962, Ser. No. 237,573
Claims priority, application Great Britain, Nov. 14, 1961, 40,630/61
6 Claims. (Cl. 324—57)

This invention relates to means for determining the self or internal impedance or the earth impedance of an electricity supply system and is concerned more particularly with the determination of the acceptability or otherwise of the self or earth impedance of the whole fault current path between any two selected points of an alternating current electricity supply system while it is energised from the main supply source, the determination being effected under heavy current or short circuit conditions.

In electricity supply systems it is common to use a fuse or other current-sensitive device as a means of preventing excess energy flowing into a faulty circuit. The effectiveness of such protection is determined by the series impedance of the circuit concerned, the fundamental parts of which are the main supply transformer, the cables connecting the supply to the installation and the earth current path followed. It is desirable to be able to measure the self and earth impedance under heavy current or short circuit conditions in order to assess whether the fuse or other device is satisfactory as a means of protecting the circuit. Methods have been devised in which low voltage currents from a separate source have been injected into part of the circuit under test. These currents have been utilised to make the impedance measurement but the method has the serious disadvantage that the exact fault current path is not strictly followed by the injected currents. Other methods have been used to apply short circuits to the system under investigation, in particular by using electromagnetic means for applying short circuits of short duration, but these are unreliable and require an appreciable length of time to assess the measurement statistically from the required number of short circuit tests.

The inventor in the present case has described in the specification of British Letters Patent No. 888,327 means for measuring the self and earth impedances of the whole fault current path of an alternating current electricity supply system while it is energised from the main supply source comprising means adapted to be connected across those points in the system the impedance between which is to be measured to provide a path between these points which is normally substantially non-conductive of current but capable of being rendered operative to pass a heavy current, which current will be caused to flow solely by reason of the potential difference existing between the points, automatic means for rendering the path operative for discrete instants of time at a regular frequency so that a current wave will be set up in the path and means for deriving from this current wave an indication representative of or proportional to the impedance between the points.

This means is somewhat complex and produces a measurement of high precision but this must be taken under exacting circumstances which permit long term critical examination of a supply system to be undertaken. Because of its complexity, however, its cost is such that electrical contractors are slow to use this type of measurement on their installation work.

Thus there is a need for a simpler device which is of a "go" or "no go" character, which is cheaper to produce and yet still affords the realism and precision resulting from heavy current or short circuit testing.

The present invention satisfies this need by providing improved means operating with a single pulse of heavy current and comprising a simple indicator.

According to the invention there is provided means for determining the acceptability or otherwise of the self or earth impedance of the whole fault current path between any two selected points of an alternating current electricity supply system while it is energised from the main supply source comprising a circuit adapted to be connected across the selected points and including means normally substantially non-conductive of current but capable of being rendered operative to pass a heavy current, which current will be caused to flow solely by reason of the potential difference existing between the selected points, manually operable means adapted when actuated to render the first-named means operative for a short period of time so that a single pulse of the heavy current will flow through the circuit and means responsive to the current flowing in the circuit adapted to produce a persisting indication whenever the magnitude of this current equals or exceeds that magnitude corresponding to the maximum permissible impedance between the selected points.

In order that the invention may be clearly understood, two examples of means in accordance therewith will now be described with reference to the accompanying drawings, wherein.

Figure 1:
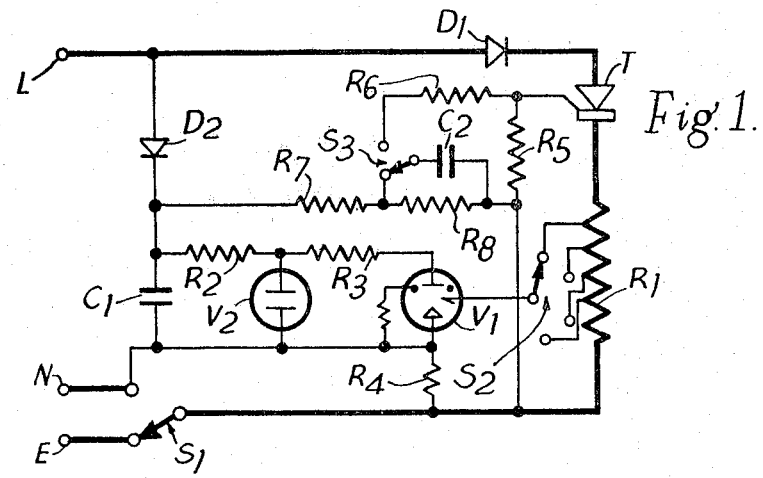
FIG. 1 is a circuit diagram illustrating a simple form of the invention.

Referring to FIG. 1, the part of the circuit which is adapted to conduct a heavy current is shown in heavy lines are these conductors are of heavy gauge copper. Terminals L, N and E at the left-hand side of FIG. 1 are intended to be connected to the live side of the consumer's supply terminals beyond the fuse, to the neutral of the consumer's supply and to the consumer's earth, respectively. $S_1$ is a change-over switch. The terminal L is connected through a rectifier $D_1$ to the anode electrode of a silicon controlled rectifier T, the cathode of which is connected by way of a heavy current type of resistor $R_1$ of low ohmic value to the movable contact of the switch $S_1$. The fixed contacts of this switch are respectively connected to the terminals N and E.

$V_1$ is a thyratron having its anode supplied with direct current by way of a half-wave rectifying and smoothing network from the terminals L and N, this network comprising the rectifier $D_2$, the smoothing capacitor $C_1$, the resistors $R_2$ and $R_3$ and the stabilising neon tube $V_2$. The cathode of the thyratron is connected directly to the terminal N and also through a high-value resistor $R_4$ to the movable contact of the switch $S_1$. The grid of the thyratron $V_1$ is connected to the movable contact of a multi-pole switch $S_2$, the fixed contacts of which are each connected to a different tapping point on the resistor $R_1$.

The control electrode of the rectifier T is connected to the junction between a resistor $R_5$ (which is connected at its other end to the movable contact of switch $S_1$) and a resistor $R_6$ which has its other end connected to one of the fixed contacts of a single-pole change-over switch $S_3$. The other fixed contact of this switch is connected to the junction between two resistors $R_7$ and $R_8$ which are connected in series between that end of the resistor $R_5$ which is remote from the control electrode and the D.C. side of the rectifier $D_2$. The movable contact of the switch $S_3$ is connected to one terminal of a capacitor $C_2$ the other terminal of which is connected to the junction between the resistors $R_5$ and $R_8$.

It will be seen that when the movable contact of the switch $S_3$ is in the position shown in FIG. 1, the capacitor $C_2$ will be charged. At the same time, as the control electrode of the rectifier T is not being supplied with current, the impedance introduced into the heavy current path by the rectifier T is extremely high, the rectifier being then substantially non-conductive of current. This is the normal setting of the circuit.

The movable contact of the switch $S_2$ may be adjusted to bear upon any one of the fixed contacts and it will be appreciated that the voltage applied to the grid of the thyratron when a heavy current flows in the resistor $R_1$ will be determined both by the magnitude of this current and by the setting of the switch $S_2$.

The device marked T has been referred to in the foregoing as "a silicon controlled rectifier" and this defines a solid state semi-conductor rectifier provided with an additional or control electrode by means of which a small direct current can be injected into the base layer to change the conductivity characteristics of the device. The rectifier has conductivity characteristics which are very similar to those of a thyratron for the forward direction of flow of current through it and which are very similar to those of a conventional diode rectifier for the reverse direction of flow of current through it. In the forward direction the rectifier normally has a very high impedance, of the order of megohms, but this can be changed exteremely rapidly to a very low impedance, of the order of a fraction of an ohm, by injecting through the control electrode a current which is quite small but nevertheless must exceed a certain critical value. If the rectifier has been rendered highly conducting to a current in the forward direction by such an injected current but the value of the latter then decays to below the critical value, the rectifier will revert to its substantially non-conducting state on the occurrence of the first zero value of the current in the forward direction after the injected current has fallen below the critical value. Such silicon controlled rectifiers are capable of withstanding relatively high voltages, such as 200 volts or more.

In the use of the means described with reference to FIG. 1, the terminals L, N and E are appropriately connected to the consumer's supply (as indicated above) and the switch $S_3$ is changed over so that its movable contact bears upon the fixed contact connected to the resistor $R_6$. The capacitor $C_2$ then discharges through the resistor to the control electrode of the silicon controlled rectifier T, the values of the capacitance and resistance employed being so chosen that the single pulse of current thereby injected into the base of the rectifier commences at a value in excess of the cricital value required to render the rectifier highly conducting but decays to below this critical value, the cricital value being reached within a period of time corresponding to the execution of at least one but no more than two positive half cycles by the alternating current supply. The rectifier T is thus rendered highly conducting and remains so only until a zero value of the alternating current occurs while the injected current is at a value below the critical value. Consequently, a pulse of heavy current, of a duration corresponding to the execution of not more than one or two positive half cycles by the alternating current, flows through the heavy current circuit including the resistor $R_1$.

If the impedance of the fault current path being investigated is sufficiently low, the magnitude of the current which flows through the resistor $R_1$ will be sufficiently high to develop a voltage capable of ionising the gas filling of the thyratron across that portion of the resistor included between the movable contact of the switch $S_2$ and the cathode of the thyratron. The latter would then fire and remain conducting despite the cessation of the heavy current. By adjusting the setting of the switch $S_2$ and repeating the test, if necessary a number of times, a setting can be found which only just causes triggering of the thyratron. The means according to the invention may be suitably calibrated so that the user can determine from the setting of the switch $S_2$ just what current has flowed in the heavy current circuit in a given test.

It will be understood that the values of this current for the settings of the switch will be chosen to agree with the requirements laid down in the appropriate regulations so that a very satisfactory "go" or "no go" test can be effected with precision.

By making use of the switch $S_1$ the test circuit can be connected between the terminals L and E (as shown) for earth-impedance testing or between the terminals L and N for self-impedance testing.

Figure 2:
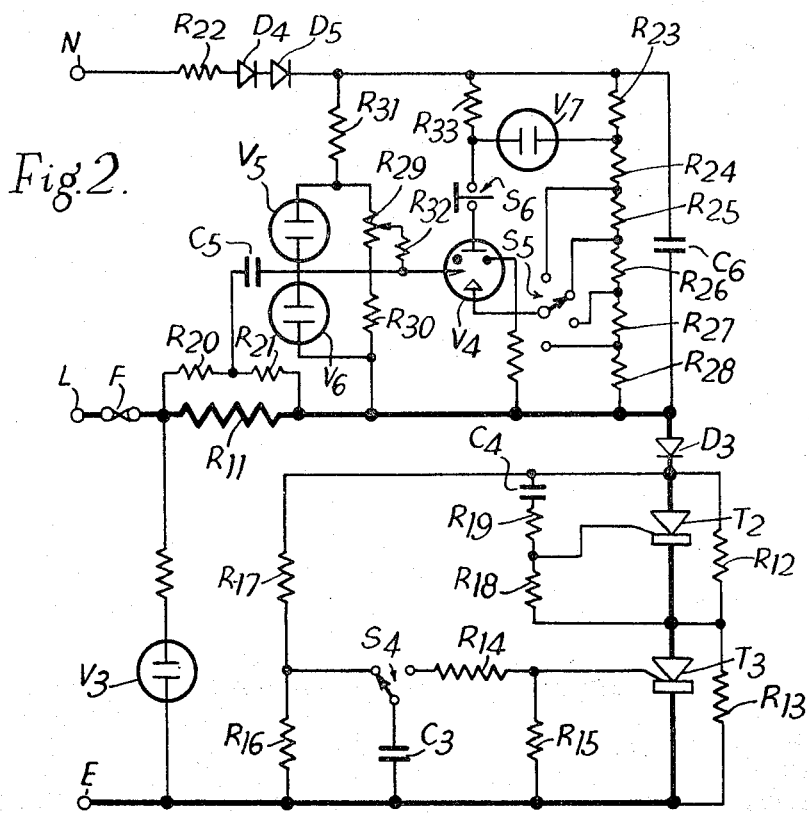
FIG. 2 is a circuit diagram illustrating a preferred embodiment of the invention.

Referring now to FIG. 2, which illustrates a preferred embodiment of the invention, this shows the testing equipment arranged for earth-impedance testing, the terminals L, N and E having the same significance as those shown in FIG. 1. As before, the heavy current circuit is shown in heavy lines.

In this embodiment, the terminal L is connected through a fuse F, a heavy current type resistor $R_{11}$ of low ohmic value and a rectifier $D_3$ to the anode of a silicon controlled rectifier $T_2$, the cathode or base electrode of which is connected to the anode of a second silicon controlled rectifier $T_3$ having its cathode or base electrode connected to the terminal E. The two series-connected rectifiers $T_2$ and $T_3$ are employed rather than a single such rectifier for reasons of economy and equalising resistors $R_{12}$ and $R_{13}$ are connected across them. The rectifier or diode $D_3$ is provided in order to protect the rectifiers $T_2$ and $T_3$ from damage by reverse voltages.

Across the terminals L and E is connected a neon tube $V_3$ (in series with a resistor) which serves to indicate when the testing equipment is live.

The control electrode of the rectifier $T_3$ is connected to the junction between resistors $R_{14}$ and $R_{15}$, the other ends of which are connected to one fixed contact of a change-over switch $S_4$ and to the terminal E, respectively. The movable contact of this switch is connected to one terminal of a capacitor $C_3$ the other terminal of which is connected to the terminal E, as also is one end of a resistor $R_{16}$ having its other end connected to the other fixed contact of the switch $S_4$.

A resistor $R_{17}$ is connected between the resistor $R_{16}$ and the D.C. side of the rectifier or diode $D_3$ and the control electrode of the rectifier $T_2$ is connected to the junction between resistors $R_{18}$ and $R_{19}$ which are connected in series with each other and a capacitor $C_4$ between the base electrode of the rectifier $T_2$ and the D.C. side of the rectifier $D_3$.

In this example, tapping of the heavy duty resistor $R_{11}$ is avoided by arranging series-connected resistors $R_{20}$ and $R_{21}$ in parallel with the resistor $R_{11}$ and tapping off from the junction between them a triggering voltage for the grid of the thyratron $V_4$. The connection from the junction to the grid is made through a capacitor $C_5$.

Between the terminals N and L is connected a rectification and smoothing circuit for supplying D.C. to the thyratron $V_4$, this circuit comprising the resistor $R_{22}$, the rectifiers $D_4$ and $D_5$ and the capacitor $C_6$. Across this circuit is connected a series resistance chain consisting of resistors $R_{23}$, $R_{24}$, $R_{25}$, $R_{26}$, $R_{27}$ and $R_{28}$, the resistor $R_{24}$ being a non-linear resistor. The cathode of the thyratron $V_4$ is connected to the movable contact of a multi-position switch $S_5$ having its fixed contacts connected to tapping points on the chain of resistors $R_{24}$ to $R_{28}$ so that the voltage of the cathode can be changed for a reason to be explained below.

The grid of the thyratron $V_4$ is biased by means of resistors $R_{29}$ and $R_{30}$ which are shunted by two series-connected neon tubes $V_5$ and $V_6$ and are supplied from the D.C. side of the rectifier $D_5$ by way of the resistor $R_{31}$.

The grid is connected through a resistor $R_{32}$ to a variable tapping point on the resistor $R_{29}$ and the arrangement is such that the grid may be biased to a preferred voltage, e.g. 110 volts.

The anode of the thyratron $V_4$ is connected to one fixed contact of a normally-closed push switch $S_6$ the other fixed contact of which is connected through a load resistor $R_{33}$ to the D.C. side of the rectifier $D_5$ and also through a neon tube $V_7$ to the junction between the resistors $R_{23}$ and $R_{24}$. When the gas-filling of the thyratron is ionised a visual indication is thereby produced and when it is not ionised and the thyratron is not conducting, the neon tube glows to produce a visual indication of opposite significance.

In order to trigger the thyratron $V_4$ (assumed to have a sensitivity of 145 volts), the equation $Vs - Vc + Vt = 145$ must be satisfied, where $Vs$ is the standing voltage from the neon tubes $V_5$, $V_6$ via the resistor $R_{29}$, $Vc$ is the cathode voltage (adjustable by operation of the switch $S_5$) and $Vt$ is the amplitude of the trigger pulse taken from the load resistor $R_{11}$. In order to achieve triggering at different values of the current flowing through the resistor $R_{11}$, it is immaterial whether $Vt$ or $Vc$ is varied. However, in order that voltage compensation may be provided, the tapping position on the resistors $R_{20}$ and $R_{21}$ is not varied and the value of $Vc$ is changed by operating the switch $S_5$.

The I.E.E. Regulations require that the fault current available must be equal to three times the rating of the fuse installed in the consumer's circuit. For example, if the fuse is rated at 13 amperes, the fault current available must be 39 amperes. On a 240 volt circuit this means a permissible fault impedance of approximately 6 ohms but on a 200 volt circuit the permissible fault impedance would be approximately 5 ohms. The voltage developed across the resistor $R_{11}$ will also depend on the voltage of the consumer's circuit. Unfortunately, the current in the test circuit has to be limited and the resistor $R_{11}$ must have an appreciable, though low, ohmic resistance. In the example shown the resistance is 15 ohms. Hence, the critical current for a 240 volt circuit with a fault impedance of 6 ohms would be approximately 11.4 amperes and for a 200 volt circuit with a fault impedance of 5 ohms would be 10 amperes. Since the ratio 11.4:10 is not the same as the ratio 240:200 it is necessary, in order to secure high accuracy at all fuse ratings, to introduce a negative voltage into the cathode circuit of the thyratron. This voltage must be non-linear and is provided by the non-linear resistor $R_{24}$ referred to above. By this means voltage compensation is afforded and all tests on circuits of different voltages may be carried out correctly merely by setting the switch $S_5$ to the appropriate fuse rating, it being understood that the equipment is calibrated so that each fixed contact of the switch corresponds to a given fuse rating, such as 100 amperes, 60 amperes, 30 amperes and 15 amperes (commencing with the uppermost contact in FIG. 2).

In the use of the means described with reference to FIG. 2, the terminals L, N and E are appropriately connected to the consumer's supply circuit, the switch $S_4$ being in the position shown, the switch $S_6$ being in the closed position and the switch $S_5$ being set to the fuse rating of the supply circuit.

The neon tubes $V_3$ and $V_7$ will then be glowing to indicate respectively, that the test equipment is live and that the thyratron $V_4$ is not conducting. The switch $S_4$ is moved to its other position to cause the already charged capacitor $C_3$ to discharge through the resistor $R_{14}$ to the control electrode of the rectifier $T_3$. This causes a pulse of current to be fed into the base of the rectifier which is sufficient to drive the rectifier into conduction but, due to the appropriate selection of the values in the drive circuit, this current rapidly decays to below the critical value, reaching this value in a period of time corresponding to the execution of at least one but not more than two positive half cycles by the alternating current supply.

When the rectifier $T_3$ conducts, the voltage across the rectifier $T_2$ is raised so that this too will conduct but, in order to ensure that there is no delay in this occurrence, the resistance-capacity network $C_4$, $R_{19}$, $R_{18}$, is provided to cause a pulse also to arrive at the control electrode of the rectifier $T_2$ which will force the latter into conduction.

A heavy current flows through the heavy-current circuit including the resistor $R_{11}$ but terminates on the occurrence of the first zero of the current after the current supplied through the control electrode has fallen to below the critical value. Thus there occurs a heavy current pulse of a duration equivalent to that of at least one positive half cycle of the alternating current.

This heavy current produces a potential difference across the resistor $R_{11}$ and a proportion of this is taken by way of the shunt circuit $R_{20}$, $R_{21}$ and the capacitor $C_5$ to the grid of the thyratron $V_4$. If the impedance of the circuit under test is not greater than the permissible impedance for the fuse rating set up on the switch $S_5$, the voltage thereby applied to the grid of the thyratron causes this to conduct and it remains conducting after the heavy current has ceased to flow. Visual indication is thus given that the circuit is "healthy," the neon tube $V_7$ extinguishing.

If the impedance of the circuit under test is greater than the permissible value, the heavy current is not sufficient to cause the appropriate potential difference to develop across the resistor $R_{11}$ and the thyratron does not fire. In this case the neon tube $V_7$ remains glowing and gives a visual indication that the circuit is "unhealthy."

The means according to the invention is relatively cheap to produce and is simple to operate, constituting a reliable "go" or "no go" testing device for the purpose in view.

I claim:

1. A device for testing the impedance of the whole fault current path between two selected points of an alternating current electricity supply system while it is energised from the main supply source comprising a silicon controlled rectifier, a load resistor of very low value, connections placing said rectifier in series with said load resistor across said selected points so that short-circuit conditions will arise whenever said rectifier is caused to conduct current, a capacitor, charging means normally connected to said capacitor to charge the same with energy from said supply system, manually operable means for disconnecting said capacitor from said charging means and connecting it to said rectifier to inject its stored energy thereinto as an insolated current pulse adapted to cause said rectifier to conduct heavy current for a very brief space of time, the passage of the resultant pulse of heavy current through said load resistor causing the development across said resistor of a potential difference inversely proportional to the impedance of the fault current path between said selected points, tapping points on said resistor, a thyratron, a multi-pole selector switch comprising a movable contact cooperating with a series of fixed contacts, a connection from each of said fixed contacts to a different one of said tapping points, a connection from said movable contact to the grid of said thyratron, and means supplying the other electrodes of said thyratron with voltages such that said thyratron will fire to produce a persisting indication whenever the potential applied to its grid by way of said selector switch at least reaches a predetermined value representing the permissible maximum impedance of said fault current path.

2. A device for testing the impedance of the whole fault current path between two selected points of an alternating current electricity supply system while it is energised from the main supply source comprising a pair of silicon controlled rectifiers, a load resistor of very low value, connections placing said rectifiers in series with each other and said load resistor across said selected points so that short-circuit conditions will arise whenever said rectifiers are simultaneously caused to conduct current, a capacitor, charging means normally connected to said capacitor to charge the same with energy from said supply system, manually operable means for disconnecting said capacitor from said charging means and connecting it to one of said rectifiers to inject its stored energy thereinto as an isolated current pulse adapted to cause said one rectifier to conduct heavy current for a very brief space of time, means causing the other of said rectifiers to become conductive of heavy current whenever said one rectifier is conductive of heavy current, the passage of the resultant pulse of heavy current through said load resistor causing the development across said resistor of a potential difference inversely proportional to the impedance of the fault current path between said selected points, a thyratron, a potential-dividing means connected across said load resistor, a connection from said potential-dividing means to supply a triggering voltage for the grid of said thyratron, pre-settable means for applying any one of a range of predetermined voltages representing prescribed conditions of said system to the cathode of said thyratron and means for supplying operating voltages to the other electrodes of said thyratron such that said thyratron will fire to produce a persisting indication whenever said triggering voltage at least reaches a predetermined value representing the permissible maximum impedance of said fault current path for the prescribed condition represented by the predetermined voltage applied to said cathode of said thyratron by said pre-settable means.

3. A device as claimed in claim 2, including a neon tube indicator connected between the anode of said thyratron and a point of predetermined potential in said system selected to cause said neon tube to glow whenever said thyratron is not conducting.

4. A device for testing the impedance of the whole fault current path between two selected points of an alternating current electricity supply system while it is energised from the main supply source comprising a silicon controlled rectifier, a load resistor of very low value, connections placing said rectifier in series with said load resistor across said selected points so that short-circuit conditions will raise whenever said rectifier is caused to conduct current, a capacitor, charging means normally connected to said capacitor to charge the same with energy from said supply system, manually operable means for disconnecting said capacitor from said charging means and connecting it to said rectifier to inject its stored energy thereinto as an insolated current pulse adapted to cause said rectifier to conduct heavy current for a very brief space of time, the passage of the resultant pulse of heavy current through said load resistor causing the development across said resistor of an impedance-indicating potential difference representative of the impedance of the fault current path between said selected points, means operable to pre-select any one of a number of predetermined different proportions of said impedance-indicating potential difference which proportions each correspond to a different fuse rating of the system under test, a thyratron form of voltage responsive indicating device operable to produce a persisting indication upon the application thereto of a potential difference of a predetermined magnitude and means for applying said preselected proportion of said impedance-indicating potential difference to the grid of said thyratron form of voltage responsive indicating device to produce a persisting indication whenever said applied proportion of said impedance-indicating potential difference at least reaches said predetermined magnitude.

5. A device for testing the impedance of the whole fault current path between two selected points of an alternating current electricity supply system while it is energised from the main supply source comprising a silicon controlled rectifier, a load resistors of very low value, connections placing said rectifier in series with said load resistor across said selected points so that short-circuit conditions will arise whenever said rectifier is caused to conduct current, a capacitor, charging means normally connected to said capacitor to charge the same with energy from said supply system, manually operable means for disconnecting said capacitor from said charging means and connecting it to said rectifier to inject its stored energy thereinto as an isolated current pulse adapted to cause said rectifier to conduct heavy current for a very brief space of time, the passage of the resultant pulse of heavy current through said load resistor causing the development across said resistor of an impedance-indicating potential difference representative of the impedance of the fault current path between said selected points, a thyratron, further means operable to apply a proportion of said impedance-indicating potential difference to said grid in order to cause the thyratron to fire and pre-settable means for adjusting the potential of the cathode of the thyratron to correspond to different fuse ratings of the system under test.

6. A device for testing the impedance of the whole fault current path between two selected points of an alternating current electricity supply system while it is energised from the main supply source comprising a silicon controlled rectifier, a load resistor of very low value, connections placing said rectifier in series with said load resistor across said selected points so that short-circuit conditions will arise whenever said rectifier is caused to conduct current, a capacitor, charging means normally connected to said capacitor to charge the same with energy from said supply system, manually operable means for disconnecting said capacitor from said charging means and connecting it to said rectifier to inject its stored energy thereinto as an isolated current pulse adapted to cause said rectifier to conduct heavy current for a very brief space of time, the passage of the resultant pulse of heavy current through said load resistor causing the development across at least a part of said resistor of an impedance-indicating potential difference representative of the impedance of the fault current path between said selected points, first indicating means operable to produce a persisting indication upon the application thereto of a potential difference of predetermined magnitude, means for applying said impedance-indicating potential difference to said first indicating means to produce said persisting indication when said applied impedance-indicating potential difference has a value at least as great as said predetermined magnitude and second indicating means responsive to the conditon of said first indicating means to produce an alternative persisting indication when said first indicating means does not produce a persisting indication and said applied impedance-indicating potential difference has a value less than said predetermined magnitude.

References Cited by the Examiner
UNITED STATES PATENTS

| 2,976,485 | 3/1961 | Bartz | 324—51 |
| 3,058,055 | 10/1962 | Muller et al. | 324—28 |
| 3,198,989 | 8/1965 | Mahoney | 317—33 |

WALTER L. CARLSON, *Primary Examiner.*

G. L. LETT, *Assistant Examiner.*